US009975215B2

(12) United States Patent
Mollone

(10) Patent No.: US 9,975,215 B2
(45) Date of Patent: May 22, 2018

(54) BASE FOR SANDING MACHINES, GRINDING MACHINES OR THE LIKE

(71) Applicant: Kunzle & Tasin S.r.l., Cassolnovo (PV) (IT)

(72) Inventor: Pasquale Mollone, Cassolnovo (IT)

(73) Assignee: KUNZLE & TASIN S.R.L., Cassolnovo (PV) (IT)

( * ) Notice: Subject to any disclaimer, the term of this patent is extended or adjusted under 35 U.S.C. 154(b) by 607 days.

(21) Appl. No.: 14/079,788

(22) Filed: Nov. 14, 2013

(65) Prior Publication Data
US 2014/0141701 A1 May 22, 2014

(30) Foreign Application Priority Data
Nov. 16, 2012 (IT) .............. PC2012A0027

(51) Int. Cl.
| | | |
|---|---|---|
| B24B 41/02 | (2006.01) | |
| B24B 55/10 | (2006.01) | |
| B24B 23/02 | (2006.01) | |
| B24B 41/047 | (2006.01) | |
| B24B 55/05 | (2006.01) | |

(52) U.S. Cl.
CPC .......... *B24B 41/02* (2013.01); *B24B 23/028* (2013.01); *B24B 41/047* (2013.01); *B24B 55/052* (2013.01); *B24B 55/102* (2013.01)

(58) Field of Classification Search
CPC ....... B24B 23/02; B24B 23/028; B24B 41/02; B24B 55/052; B23Q 9/0028; B60B 33/08; A45C 2005/142; A45C 5/14; A45C 5/141
USPC ................. 451/353, 359; 16/19–28
See application file for complete search history.

(56) References Cited

U.S. PATENT DOCUMENTS

| | | | | |
|---|---|---|---|---|
| 1,951,105 A | * | 3/1934 | Myers ................. | B24B 55/102 15/49.1 |
| 2,451,353 A | * | 10/1948 | Newell ................. | B60B 33/08 16/27 |
| 2,624,896 A | * | 1/1953 | Atkin ................. | A47L 11/1625 15/354 |
| 2,626,412 A | * | 1/1953 | Petersen ............. | A47L 11/1625 15/354 |
| 3,091,158 A | * | 5/1963 | Fritz ................. | E04F 21/24 15/49.1 |
| 3,452,380 A | * | 7/1969 | Walther ............. | A47L 11/4072 15/49.1 |

(Continued)

FOREIGN PATENT DOCUMENTS

DE    29904656    7/1999

OTHER PUBLICATIONS

Cited in the Italian Search Report dated Jul. 15, 2013, corresponding to the priority application No. PC2012A000027.

*Primary Examiner* — Monica Carter
*Assistant Examiner* — Marcel Dion
(74) *Attorney, Agent, or Firm* — Young & Thompson

(57) ABSTRACT

A base for sanding machines, grinding machines or the like includes a body (10) connectable to a machine (M) or integral therewith, the body (10) being provided with at least three supports (P) arranged in such a manner that their ends (P') lie on a plane (L) and configured in such a manner that at least one tool (T) of the machine projects at least partly beyond the plane (L) by a portion (D), the body (10) being provided with elements adapted to vary the position of the plane (L) with respect to the tool (T).

19 Claims, 3 Drawing Sheets

(56) References Cited

U.S. PATENT DOCUMENTS

| | | | | |
|---|---|---|---|---|
| 4,099,328 A | * | 7/1978 | Schlemmer | E04G 23/006 15/385 |
| 4,203,177 A | * | 5/1980 | Kegg | B60B 33/08 16/24 |
| 4,715,087 A | * | 12/1987 | Todd | A47L 11/162 15/230 |
| 5,125,190 A | * | 6/1992 | Buser | B24B 55/102 451/359 |
| 5,455,988 A | * | 10/1995 | Marraccini | B60B 33/08 16/27 |
| 6,821,194 B1 | * | 11/2004 | Troyer | B24B 7/186 451/350 |
| 7,247,085 B1 | * | 7/2007 | Anderson | A47L 11/162 15/340.1 |
| 2002/0115396 A1 | | 8/2002 | Sarantitis | |
| 2005/0079809 A1 | * | 4/2005 | Zayat | B44D 3/16 451/359 |

\* cited by examiner

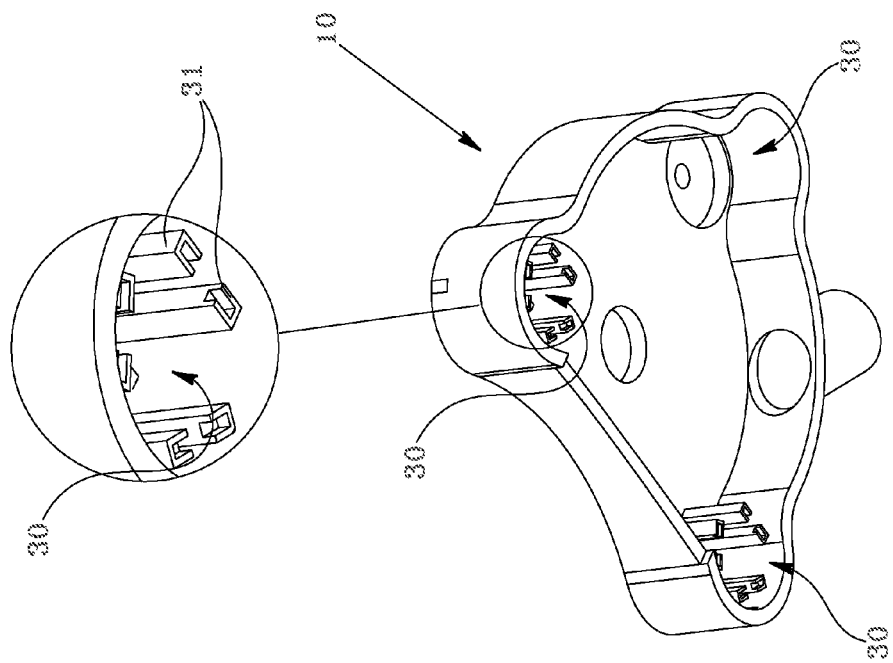
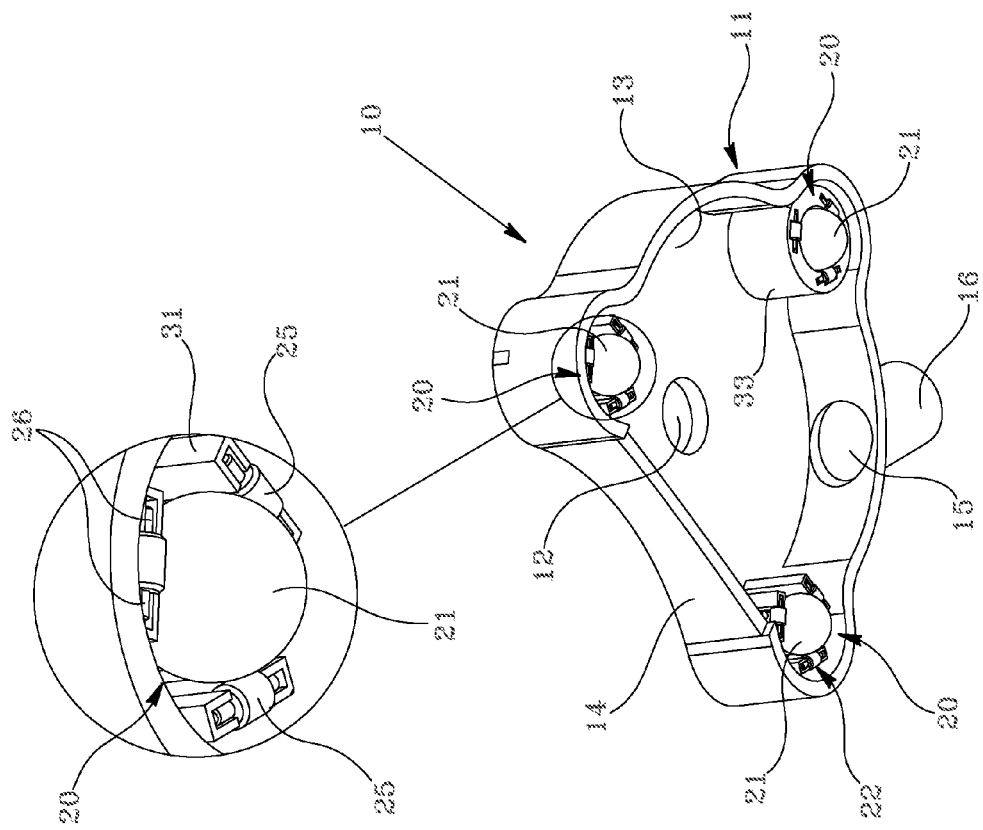

BASE FOR SANDING MACHINES, GRINDING MACHINES OR THE LIKE

FIELD OF THE INVENTION

The present invention relates to a base for sanding machines, grinding machines or the like and in particular a base for disc sanding machines or grinding machines.

More in detail, the invention relates to an omnidirectional sliding base for portable or semi-portable sanding or grinding machines adapted to facilitate their use on flat surfaces.

The invention also relates to a sanding or grinding machine provided with this base.

BACKGROUND OF THE INVENTION

There are known on the market various types of disc sanding or grinding machines to perform cleaning, polishing, grinding or brushing operations on substantially flat surfaces made of stone, wood, metal, glass or composite materials.

These machines generally comprise one or more discs or plates (to which different tools, with different degrees of abrasion, are fitted), which are rotated around their axis, around an orbit, or both, and which, in contact with a surface, perform one of the aforesaid machining operations.

Portable grinding machines, angular or axial, are generally provided with a single disc of limited dimensions (generally less than 250 mm in diameter) connectable to a machine body that, as well as containing a motor, is often also shaped to act as handle for at least one of the operator's hands.

However, these prior art portable grinding machines, when used on substantially flat surfaces, have some limits and drawbacks.

In fact, they have no base and consequently all translations of the tool, both parallel and perpendicular to the surface, are controlled by the operator performing the machining operation.

Above all, during sanding or grinding operations on flat surfaces such as floors, walls, but also beds or the like, it is important that the contact pressure exerted by the tool is as constant as possible and that it maintains a given angular position with respect to the surface (generally with an angle between 0° and 1°).

With prior art portable sanding and grinding machines this is practically impossible even for the most skilled operators as, without the aid of any reference, these parameters are controlled and managed in an entirely manual manner based on the sensitivity of the operator's limbs.

Moreover, handling of these portable devices is made even more difficult by the torque that is transmitted to the body of the machine by the tool when it comes into contact with the surface to be machined.

Therefore, the operator, who already has to oppose rotation of the machine body, also has the difficult task of correctly metering the pressure of the tool and of correcting its angle with precision.

Consequently, surfaces machined with these devices always have various imperfections, such as ridges, dips and areas with different degrees of roughness.

Moreover, with these prior art machines, machining operations on flat surfaces, even of limited dimensions, requires considerable mental and physical effort by the operator.

Similarly to portable machines, semi-portable sanding machines also comprise one or more rotating abrasive discs, but unlike the former, given the larger dimensions and increased weight, these are almost always mounted on a base that facilitates their translation on the surface to be machined.

These bases are typically provided with a pair of wheels placed side by side on the same side of the machine as the handle used to guide it during machining.

Machines configured in this manner also have some limits and are therefore subject to improvement.

The weight of these machines is discharged on three areas of contact with the surface: two on the two supporting wheels and one on the machining disc or discs.

During machining operations of sanding, grinding, brushing or polishing etc., the pressure exerted by the tool is a function of the portion of weight that is discharged to the ground, which in turn depends on the force with which the operator presses on the guiding handle while moving the machine.

In practice, to allow the machine to move forward, the operator must exert a thrust in a direction substantially parallel to the surface to be machined (floor, shelf, etc.) and also press (use leverage) on the handle to discharge part of the weight transmitted to the tool and thereby reduce friction.

Just as in the case of portable machines, also in this case it is difficult or even impossible to maintain a constant thrust on the handle in order to maintain a constant pressure exerted on the surface to be sanded/polished.

In the same way, the angular position of the tool is almost never constant as it is subject to a deformation, caused by compression on the surface, which is more or less accentuated as a function of the tool material (metal, resins, etc.).

With prior art portable and semi-portable sanding machine it is therefore difficult to obtain a machined surface without defects, which are more accentuated when the operator lacks experience.

In this context, the object of the present invention is to provide a base for sanding machines, grinding machines or the like, which overcomes the problems of the prior art described above.

SUMMARY OF THE INVENTION

In particular, the object of the present invention is to produce a base for sanding machines, grinding machines or the like that enables an improvement of the quality of machining on substantially flat surfaces such as floors, walls, beds or the like and at the same time simplifies use of the machine.

In detail, the object of the present invention is to produce a base for sanding machines, grinding machines or the like that enables the pressure exerted by the tool (abrasive discs, brushes, etc.) on the surface to be machined, and the angular position thereof during movement of the machine, to be maintained constant.

A further object of the present invention is to provide a base for sanding machines, grinding machines or the like, which enables, when necessary, the height and the angular position of said tool to be varied as a function of the material of the surface and of the type of machining operation to be performed (sanding, grinding, brushing, polishing, etc.).

Another object of the present invention is to propose a base for sanding machines, grinding machines or the like that can be easily mounted on and removed from the machine to be used only when required.

These objects are substantially achieved by a base for sanding machines, grinding machines or the like comprising a body connectable to a machine or integral therewith, said body being provided with at least three supports arranged in such a manner that their lower ends lie on a plane and configured in such a manner that at least one tool of the machine projects at least partly beyond said plane by a portion, said base being provided with means adapted to vary the position of said plane with respect to said tool.

The base thus configured consequently enables the tool to be maintained in contact with the surface to be machined with a given pressure defined initially as a function of the position of the plane with respect to the tool and any variations in load caused by the action of the operator to be discharged on the supports at all times.

Said means to vary the position of the plane can be configured to vary the position of at least one of said supports with respect to the tool, or alternatively can be configured to vary the position of the whole of the body of the base, and therefore of all the supports with respect to the tool.

According to a preferred variant of the invention, the supports are arranged around a circumference having a larger diameter with respect to that of the tool and centred with its rotation axis.

This enables the weight of the machine to be discharged evenly on the supports (above all for semi-portable machines) and the machine to remain balanced at all times, facilitating its movement on the surface to be machined.

Again according to a preferred variant, said supports are provided with swiveling wheels, and more preferably with spherical wheels, which further improve practicality of use by the operator.

BRIEF DESCRIPTION OF THE DRAWINGS

Further characteristics and advantages of the present invention will become more apparent from the following indicative, and therefore non-limiting, description of an example of a preferred but not exclusive embodiment of an auxiliary propulsion system, as illustrated in the accompanying drawings, in which:

FIG. 5 is a bottom perspective view of the base of FIG. 1; and

FIG. 6 is a bottom perspective view of the base of FIG. 1 partly assembled.

DETAILED DESCRIPTION OF THE INVENTION

Figure 1:
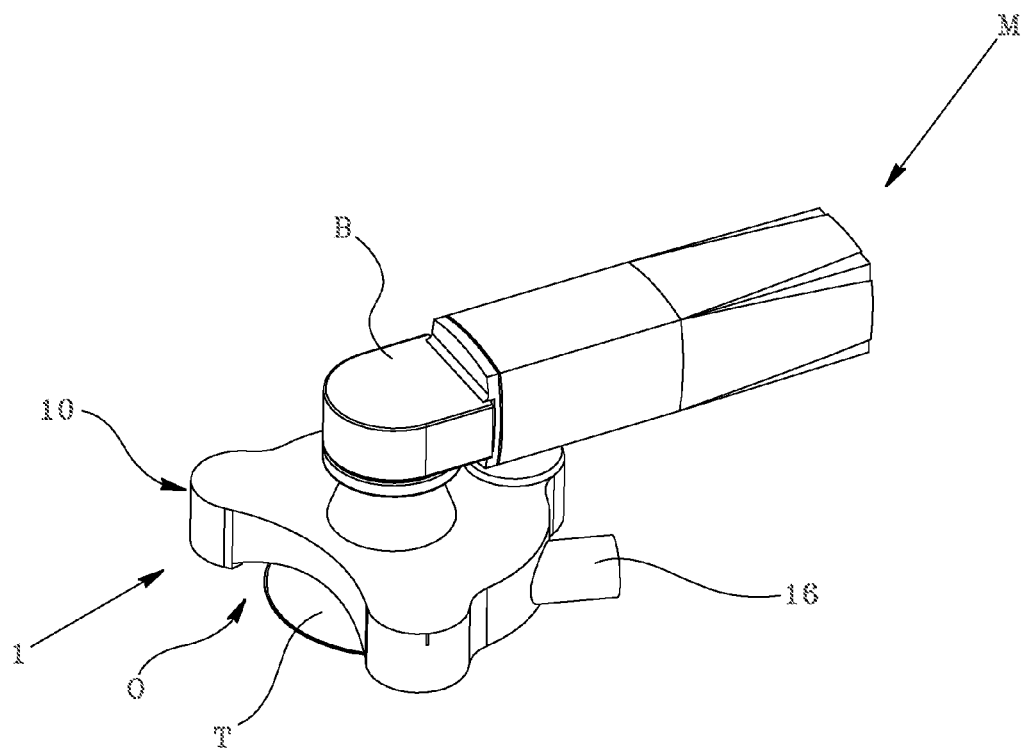
FIG. 1 is a top perspective view of a base for sanding machines, grinding machines or the like, according to an embodiment of the invention, applied to a portable grinding machine.
Figure 2:
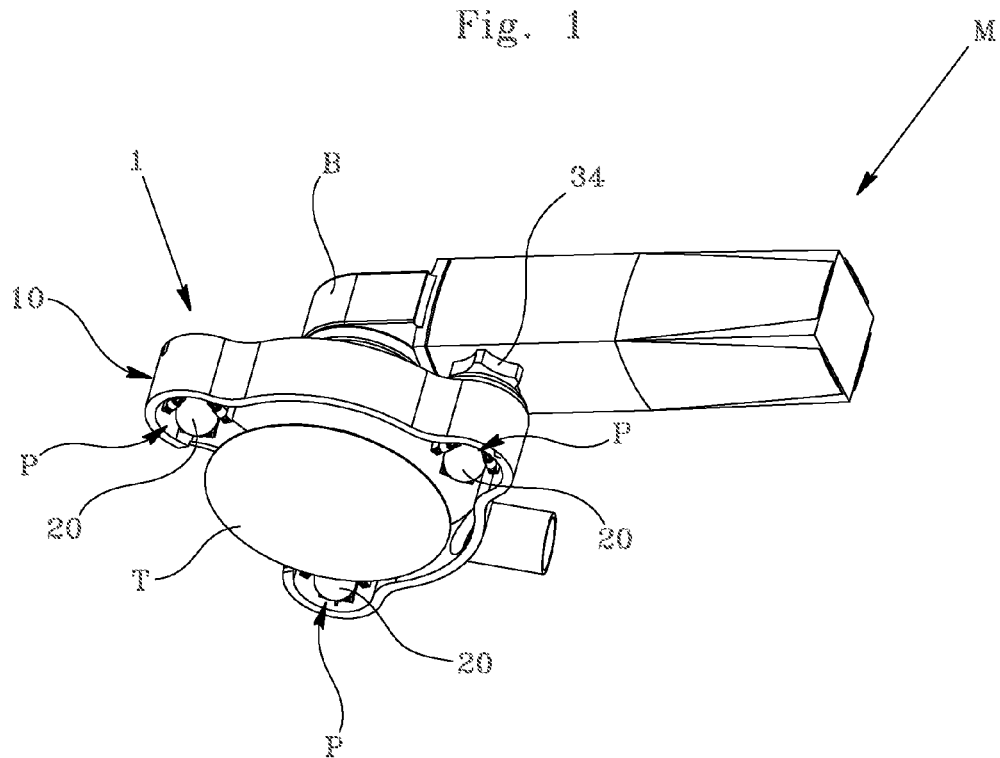
FIG. 2 is a bottom perspective view of the base of FIG. 1 applied to a portable grinding machine.

With reference to the accompanying FIGS. 1 and 2, there is illustrated a base for sanding or grinding machines, indicated as a whole with 1, applied to a sanding/grinding machine M.

In detail, the base 1 according to the invention comprises a body 10 provided with at least three supports P arranged around a tool T of the machine. As already mentioned, said tool T can comprise one or more rotating discs on which accessories can be mounted to perform different types of machining operations, such as sanding, grinding, brushing, polishing, etc.

In the example illustrated, the machine M comprises a single rotating disc T.

According to a preferred embodiment, said supports P are arranged along a circumference C having a larger diameter with respect to that of the tool T and the centre of which preferably coincides with the rotation axis of said tool.

Figure 3:
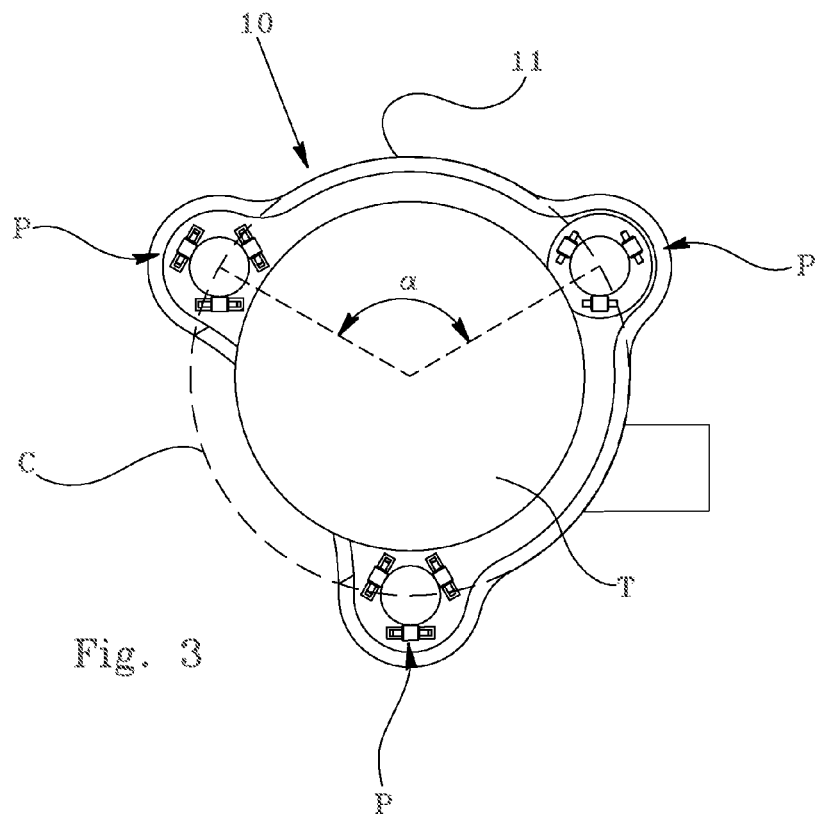
FIG. 3 is a bottom plan view of the base of FIG. 1.

Even more preferably, said supports P can be arranged spaced angularly at equal distances from one another on said circumference C; for example, if the base comprises three supports P (as in the example in the figure) the angle a between each of them is 120° (FIG. 3).

Figure 4:
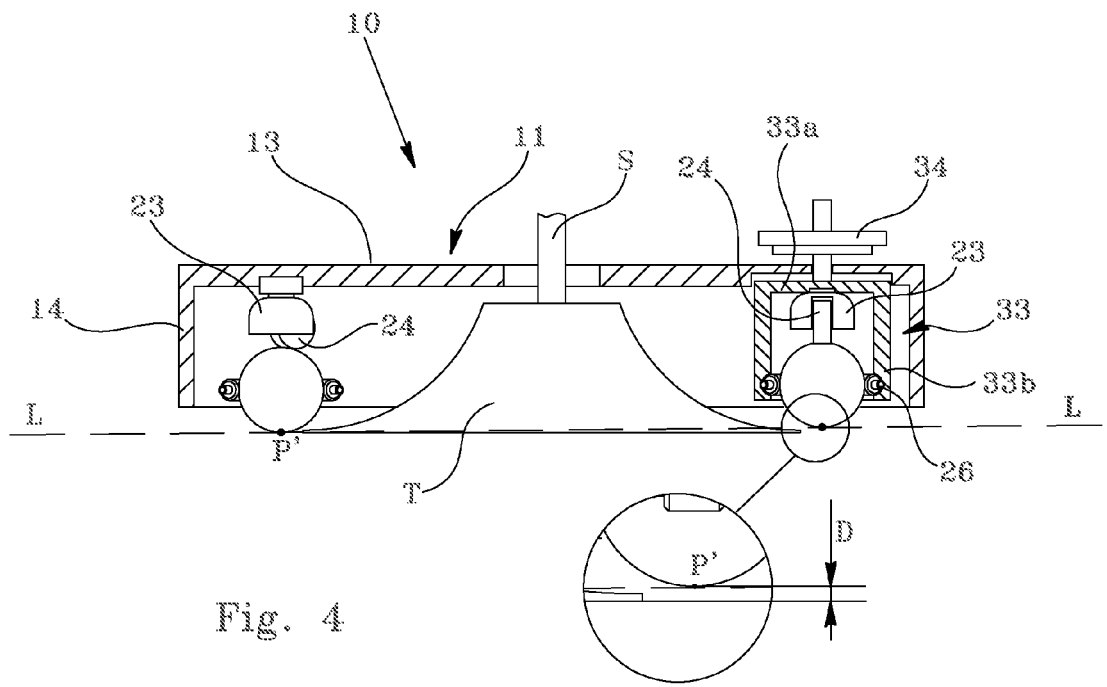
FIG. 4 is to sectional side view of the base of FIG. 1.

According to the invention the body 10 is configured in such a manner that the lower ends P' of the supports P lie on a plane L and, at least in one point, the tool T projects partly beyond said plane L by a portion D (FIG. 4).

In practice, the base is configured so that when the supports P are in contact with the surface to be machined, the tool T is maintained pressed against said surface with a given pressure required to enable said tool to remove a given quantity of surface material (as a function of the type of machining operation).

This pressure value is a function both of the width of the portion D and of the type of material of which the tool is composed (metal, resins, textile, etc).

The width of said portion D can vary from a value of a few tens of millimeter for stiffer tools to a few millimeters for flexible tools such as brushes or fabric tools.

Advantageously, the supports P are constrained to the body 10 of the base in a substantially rigid manner so that, during the machining operation, any variations of load caused by the action of the operator are discharged only on said supports P.

Due to this, it is possible for the pressure exerted by the tool T on the surface to machine to be maintained constant while the machine is translated parallel to the plane L.

Moreover, due to this configuration, it is also possible for the angular position of the tool with respect to the surface, i.e. its deformed profile, to be maintained unchanged (as the profile of the tool T in contact with the surface is always slightly deformed as a function of the material of which it is composed and of the width of the portion D).

This enables maximum uniformity of the machining operation, above all in the case of sanding and grinding, without the operator having to modulate the pressure exerted on the machine body or on the guiding handle.

In short, the operator requires only to translate the machine parallel to the surface to be machined maintaining the supports in contact with it.

Advantageously, according to the invention, said body 10 is also provided with means adapted to vary the position of the plane L with respect to the tool T, i.e. the width of the portion D by which the tool T projects from said plane, and therefore the pressure exerted on the surface to be machined.

In practice, by varying the width of the portion D (with the same tool), when the supports P are in contact with the surface to be machined the tool T will be pressed against it to a greater or lesser degree.

By adjusting the base in advance and in an adequate manner as a function of the type of machining operation and of the material of the surface, it is possible to obtain maximum machining precision without the operator performing the operation requiring particular effort or skills.

According to a preferred variant said means adapted to vary the position of the plane L are configured to act on at least one of the supports P.

In detail, said means enable the position of at least one of said supports P to be varied with respect to the tool T, consequently also varying the position of the plane L with respect to it.

Alternatively, said means can be configured to vary the position of the body 10 with respect to the body of the machine and consequently also with respect to the tool T.

Advantageously, according to the invention, the supports P can comprise swiveling wheels (20) that enable the base to translate freely along any direction.

The action of the operator is therefore even more practical and less demanding, as the machine can be given the ideal trajectory without having to perform particular manoeuvres and with minimum effort.

Preferably, said swiveling wheels 20 comprise spherical wheels that ensure minimum inertia during changes of direction with respect to conventional pivoting wheels and further facilitate movement on the plane.

With reference to the accompanying figures, as already mentioned, these show an embodiment of the base preferably, but not exclusively, adaptable to portable sanding or grinding machines.

According to this variant, the body 10 comprises a cover 11 placed around the tool T (rotating disc) on which the swiveling wheels 20 are mounted.

Advantageously, according to a preferred embodiment, said cover 11 is provided with means for fixing to the machine M in proximity of the shaft S that rotates the tool T.

More in detail, said cover 11 is provided with a hole 12, concentric with the circumference C (on which the supports P lie), adapted to enable the passage of the shaft S and to couple in a movable manner with a connection element provided on the machine body B.

For example, the hole 12 can be structured to interlock with said complementary element provided on the machine body B.

Alternatively, a threaded ring nut (not shown in the figure) can be provided, adapted to clamp the cover 11 against said machine body B.

As a further alternative, said hole 12 can be provided with a thread adapted to house a threaded bushing integral with the machine body B.

In this way, the base can be installed easily on a sanding machine when this is to be used to perform machining operations on substantially flat surfaces and can also be easily removed to perform other operations.

According to another variant of the invention, said cover 11 can instead be produced in one piece with the body B of the machine.

According to the embodiment illustrated, said cover 11 comprises a substantially flat cap 13 and a lateral edge 14 that substantially surrounds the tool T.

Besides acting as supporting structural element, said cover 11, also due to its structure, has the function of retaining the material removed from the machined surface and preventing it from being dispersed by the rotating tool T.

For this purpose, in the cover 11 there can be produced an opening 15 provided with a projecting duct 16 connectable to a suction system for dust and debris.

Preferably, said cover is configured in such a manner as to be provided, on a portion of the lateral edge 14, with an opening O that enables a portion of the tool T to project beyond the lateral edge 14.

This enables precise machining operations also of areas of flat surfaces placed close to vertical walls.

According to a preferred variant, said swiveling wheels 20 can comprise a ball 21 housed in a seat 30 provided with supporting means 22 adapted to discharge the weight of the machine M (and any loads exerted by the operator) on said ball 21 and at the same time to enable it to roll freely inside the seat.

Advantageously, said supporting means can comprise a fork 23, hinged on the cap 13 of the cover 11, able to rotate freely on an axis substantially vertical and passing through the centre of the ball 21 on which there is mounted a first roller 24 free to rotate in contact with the upper surface of said ball.

This configuration enables the inertia of the wheel to be reduced to a minimum during changes of direction of the machine, improving machining precision and reducing the effort required by the operator.

To further improve rolling of the ball 21 in the seat 30, said supporting means can also comprise at least three radial rollers 25 arranged around the ball 21 on a horizontal plane passing through the centre of the ball.

With this configuration the ball 21, during its rolling, remains at all times in contact with the first roller 24 and with at least one radial roller 25, further reducing friction and the effort required by the operator.

In detail, said at least three rollers 25 are mounted on journals 26, in turn connected integrally to the cover 11.

Even more in detail, each journal 26 is supported at the ends by a pair of brackets 31 projecting from the lower surface of the cap 13 of the cover 11.

The cover 11 thus configured can be made in one piece in moulded plastic, thus making it easy and inexpensive to produce.

As already mentioned, the base 1 is also provided with means adapted to vary the position of the plane L with respect to the tool T.

According to the embodiment illustrated, said means comprise at least one bushing 33 mounted at least at one support P able to translate vertically along a substantially vertical axis.

Said bushing 33 therefore acts as seat 30 to house both the ball 21 and the supporting means 22.

According to the invention, said bushing 33 is connected to the cover 11 through a screw system 34 that can be operated manually or electrically, which enables the position of the bushing to be varied with respect to the cover 11 and consequently of the ball 21 housed therein.

As already explained previously, variation of the position of the ball 21 (supporting point P') enables variation of the relative position between the plane L and the tool T, and therefore also of the width of the portion D.

More in detail, the fork 23 is hinged in the upper wall 33a of said bushing while the journals 26 of the rollers 25 are housed in slots produced in the lateral wall 33b.

If necessary, all the supports P of the base can be provided with a height adjustment system, in such a manner as to be able to vary the height of the base without modifying the relative angle between it and the tool T.

For example, each swiveling wheel of the base can be provided with an adjustment system like the one describe above.

The present invention, as described and illustrated, may be subject to various modifications and variants, all of which fall within the scope of the invention; furthermore, all the details may be replaced with other technically equivalent elements.

The invention claimed is:

1. A machine for sanding or grinding, comprising:
a base (1) firmly connected to a body (B) of the machine; and
a tool (T) for sanding or grinding, configured to operationally rotated about a rotation axis;
wherein a body (10) of the base (1) comprises
a cover (11), a top wall of the cover formed by a cap (13), and an enclosing side wall of the cover formed by a lateral edge (14) that extends laterally from a periphery of the cap (13), the cap (13) and lateral edge (14) together forming an interior of the cover (11) that surrounds the tool to retain material that is removed from a surface machined by the tool during operation of the tool, thereby preventing the material from being dispersed by the tool during operation of the machine, and
at least three supports (P), mounted to an inner surface of the cover (11), said cover (11) being rigid so as to support loads applied to said at least three supports (P),
the supports (P) each having an end (P'), and the supports (P) being arranged in such a manner that the ends (P') of the supports (P) lie in a plane (L), and said supports (P) being further configured such that the tool (T) of the machine projects at least partly beyond said plane (L) by a portion (D),
wherein said supports (P) are provided with swiveling spherical wheels (20) that each comprise
a ball (21) located in a seat (30) formed in the body (10) of the base, and
support structures (22) that support the ball, adapted to discharge the weight of the machine (M) on said ball (21) and adapted to permit the ball to rotate freely inside the seat (30),
wherein at least one of the supports (P) comprises a bushing (33) containing both the ball (21) and said support structures (22), said bushing connected to the cover (11) via a screw system (34) that is operable to translate the at least one of the supports vertically along a substantially vertical axis with respect to the body (10) of the base for varying a position of said at least one bushing (33) and ball (21) with respect to the cover (11) in order to adjust the position of the plane (L), with respect to the tool (T), and thereby vary a width of the portion (D).

2. The machine according to claim 1, wherein the cover (11) is provided with an opening (15) in communication with a projecting duct (16) connectable to a suction system for dust and debris.

3. The machine according to claim 1, wherein said cover (11) has an opening (O) where a portion of the tool T projects outside the lateral edge (14).

4. The machine according to claim 1, wherein said support structures (22) comprise at least one fork (23) hinged on the cover (11) and configured to rotate freely on an axis substantially vertical and passing through the centre of the ball (21),
said at least one fork (23) having mounted thereon a first roller (24) free to rotate in contact with an upper surface of the ball (21).

5. The machine according to claim 1, wherein said support structures (22) comprise at least three radial rollers (25) arranged around the ball (21) on a horizontal plane passing through the centre of the ball.

6. The machine according to claim 5, wherein said at least three radial rollers (25) are mounted on journals (26), in turn supported by a pair of brackets (31) connected to the cover (11).

7. The machine according to claim 1, wherein said supports (P) are arranged around a circumference (C) having a larger diameter than that of the tool (T) and having a center coincident with the rotation axis of said tool (T).

8. The machine according to claim 2, wherein said cover (11) has an opening (O) where a portion of the tool (T) projects outside the lateral edge (14).

9. The machine according to claim 2, wherein said support structures (22) comprise at least one fork (23) hinged on the cover (11) and configured to rotate freely on an axis substantially vertical and passing through the centre of the ball (21), said at least one fork (23) having mounted thereon a first roller (24) free to rotate in contact with an upper surface of the ball (21).

10. The machine according to claim 3, wherein said support structures (22) comprise at least one fork (23) hinged on the cover (11) and configured to rotate freely on an axis substantially vertical and passing through the centre of the ball (21),
said at least one fork (23) having mounted thereon a first roller (24) free to rotate in contact with an upper surface of the ball (21).

11. The machine according to claim 2, wherein said support structures (22) comprise at least three radial rollers (25) arranged around the ball (21) on a horizontal plane passing through the centre of the ball.

12. The machine according to claim 3, wherein said support structures (22) comprise at least three radial rollers (25) arranged around the ball (21) on a horizontal plane passing through the centre of the ball.

13. The machine according to claim 4, wherein said support structures (22) comprise at least three radial rollers (25) arranged around the ball (21) on a horizontal plane passing through the centre of the ball.

14. The machine according to claim 13, wherein said at least three radial rollers (25) are mounted on journals (26), in turn supported by a pair of brackets (31) connected to the cover (11).

15. The machine according to claim 4, wherein, for at least one of the supports (P), said fork (23) is hinged on the cap (13) of the cover (11).

16. The machine according to claim 4,
wherein, for at least one of the supports (P), said fork (23) is hinged on an upper wall (33a) of said bushing (33), and
wherein journals (26), onto which the rollers (25) are mounted, are housed in slots produced in a lateral wall (33b) of the bushing (33).

17. The machine according to claim 1, wherein the cover (11) is formed as one piece with the body (B) of the machine.

18. The machine according to claim 15, wherein the cover (11) is formed as one piece with the body (B) of the machine.

19. The machine according to claim 1, wherein the swiveling wheels are arranged within the cover (11).

* * * * *